United States Patent [19]
Geisow

[11] 3,948,099
[45] Apr. 6, 1976

[54] FLOW METER HAVING SELF-CENTERING ROTOR ASSEMBLY

[75] Inventor: Bernard H. Geisow, Houston, Tex.

[73] Assignee: Daniel Industries, Inc., Houston, Tex.

[22] Filed: Sept. 30, 1974

[21] Appl. No.: 510,357

[52] U.S. Cl. ............................................... 73/231 R
[51] Int. Cl.² .......................................... G01F 1/12
[58] Field of Search .............. 73/231 R, 231 M, 272

[56] References Cited
UNITED STATES PATENTS
3,798,968   3/1974   Harris ................................ 73/231 R

*Primary Examiner*—Jerry W. Myracle

[57] ABSTRACT

A flow meter for measuring the volume of flowing fluid through a conduit is provided with a self-centering rotor assembly that becomes precisely centered within a flow chamber of the flow meter upon assembly of the flow meter construction. Rotor support means may be provided having cam surfaces defined thereon, which cam surfaces have cooperative camming engagement with appropriate surfaces formed on the rotor assembly and are adjusted during assembly of the rotor mechanism to accomplish centering of the rotor mechanism within the housing structure and to establish tight frictional engagement with the inner wall structure of the housing to positively lock the rotor assembly in its centered position within the flow chamber.

16 Claims, 4 Drawing Figures

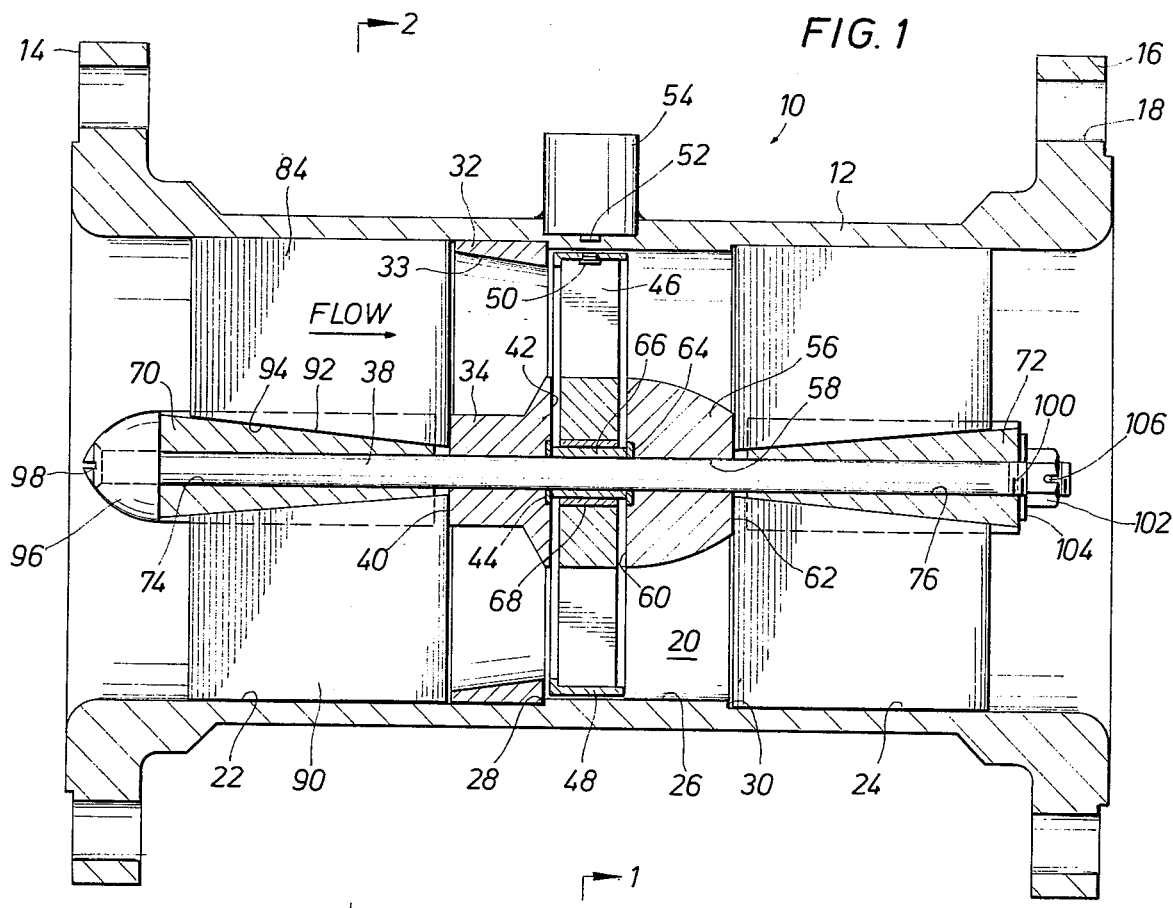
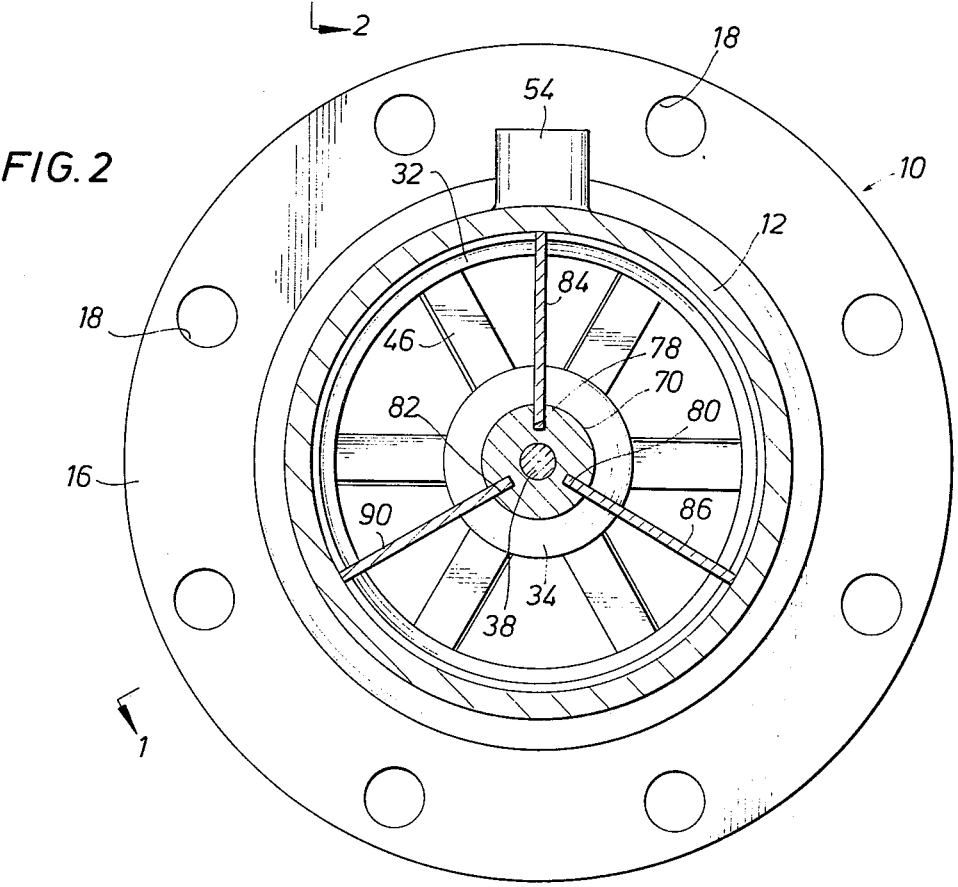

FLOW METER HAVING SELF-CENTERING ROTOR ASSEMBLY

FIELD OF THE INVENTION

This invention relates generally to flow meters having internal rotors that rotate responsive to the flow of fluid medium therethrough and which provide signals corresponding to the volume of fluid flowing through the meter mechanism. More particularly, the present invention is directed to a novel flow meter construction wherein a rotor assembly is properly positioned in axially centered relationship with the housing structure by cooperative camming and support devices to facilitate ease of assembly and to facilitate relatively low cost manufacture.

BACKGROUND OF THE INVENTION

It is well known in the manufacture of most mechanical devices that the degree of accuracy to which any mechanical device is constructed may be controlled according to the tolerance level or margin of error to which the various parts of the device are constructed. Various matters, such as quality of surface finish, type of material, character of heat treating, etc. are largely determinative not only of the quality of the mechanical device, but also these factors affect the cost of manufacturing of such devices. In fact, costs of manufacturing in most circumstances appear to be reflected by the character of manufacturing tolerances and materials to an exponential degree. In other words, manufacturing costs rise exponentially with improvement of the quality of most mechanical devices. In most circumstances, however, there is a limit to the quality of any particular product, depending upon the purchasers use of that particular product and the price the purchaser is willing to pay for the product.

In the field of flow meter manufacture the foregoing holds true, because manufacturing costs appear to be exponentially related to the quality of machining operations, quality of bearings and other parts as well as the quality of the material that is utilized in the manufacturing process. It is desirable, however, to provide a flow meter construction, especially for flowing liquid, that is extremely sensitive to all conditions of flow and provides as accurate a readout of the volume of flowing liquid as is practical. This factor holds true regardless of the particular type of flow meter involved.

Although the present invention may find effective application in various types of flow meter constructions, for the purpose of simplicity and to facilitate a ready understanding of the present invention, the invention will be set forth herein particularly as it relates to turbine or axial fluid flow meters, especially suited for measuring flowing liquid. Such flow meters typically utilize magnets or magnetically attracted slugs that are radially disposed in a member that rotates with the rotor and induces a magnetic flux (induction or variable reluctance) in a fixed core spaced from and aligned with rotating magnets or slugs. The magnetic flux induced in the core in turn induces a signal in a coil wound about the core member which signal is transmitted to appropriate registering equipment. The radial displacement of the magnets from the rotational axis of the rotor is small compared with the average radius through which the fluid acts on the blades, thus enhancing the mechanical advantage of the meter and providing extremely linear low flow rate and low pressure preformance.

It is not intended, however, to restrict the present invention to this particular application, it being obvious that the present invention may be effectively employed in conjunction with different flow meter devices as well as other mechanical devices having turbines or rotors without departing from the spirit or scope hereof.

In the manufacture of turbine flow meters of the nature indicated above, it is desired that the rotor assembly, including the rotatable rotor element, be precisely centered within the bore or flow passage of a flow meter housing structure and that the axis of the rotor be oriented in precisely parallel relation to the linear direction of fluid flow, to enhance the mechanical advantage of the meter as much as possible to provide extremely linear low flow rate and low pressure performance which are qualities that are especially desired in both liquid and gas flow meters. To accomplish precise centering of the rotor assembly and to insure precisely parallel relationships between the axis of the flow meter and the flow of fluid through the meter assembly, it is typically required that spaced high quality precisely concentric surfaces be machined in a flow meter housing structure, which surfaces receive rotor assembly support elements to support the rotor assembly in positive relation to these concentric surfaces.

It is also necessary that the concentric surface be of precisely the same dimension so that each of the typically spaced rotor support devices may be precisely related to one another. Machining operations necessary to produce the high quality concentric and precisely sized cylindrical surfaces within flow meter housing causes the development of rather high manufacturing costs, but such costs, prior to development of the present invention, were deemed to be warranted in view of the desirability to provide a high quality flow meter construction having optimum low pressure performance capabilities. High costs of such machining operations is typically considered a necessity.

Accordingly, it is a primary object of the present invention to provide a novel flow meter construction incorporating a simple and efficient mechanism for achieving precise centering of a rotor assembly relative to a flow passage in a rotor housing structure, which does not necessitate the provision of high quality high cost machining operations.

It is a further object of the present invention to provide a novel flow meter construction wherein concentric bores or cylindrical surfaces may be formed in a flow meter housing by relatively low cost machining operations without sacrificing from the standpoint of accuracy in concentricity or positioning of the rotor within the housing structure.

It is also an object of the present invention to provide a novel flow meter construction wherein concentricity and positive alignment of the rotor assembly within a flow meter housing may be effectively maintained even though the spaced bores engaged by the flow meter supports are of different dimension.

Among the several objects of the present invention is noted the contemplation of a novel flow meter construction having means for supporting a rotor assembly within a flow meter housing, which means react with the rotor assembly and with the housing structure to achieve precise centering and positioning of the rotor assembly during assembly of the flow meter construction.

It is another important object of the present invention to provide a novel flow meter construction wherein the internal parts of the flow meter construction including the rotor, the rotor assembly and the rotor assembly support system may be quickly and simply placed within a flow meter housing structure by relatively inexperienced personnel and may be quickly locked into precise assembly simply by simple adjustment.

It is an even further object of the present invention to provide a novel flow meter construction including an internal rotor assembly and rotor support mechanism that may be quickly and simply disassembled through the use of simple tools for purposes of repair or replacement of the internal parts of flow meters and other similar mechanical devices.

It is also an object of the present invention to provide a novel flow meter construction that may be repaired or adjusted in the field without any requirement for the use of specialized tools for disassembly or assembly thereof.

Other and further objects, advantages and features of the invention will become obvious to one skilled in the art upon an understanding of the illustrative embodiments about to be described and various advantages, not referred to herein, will occur to one skilled in the art upon employment of the invention in practice.

SUMMARY OF THE INVENTION

Flow meters, such as turbine flow meters particularly described herein, may comprise a housing that is formed to define a flow chamber with inlet and outlet openings being in communication with the flow chamber. A rotor assembly is disposed within the flow chamber which incorporates a freely rotatable rotor supporting at least one magnet that induces a magnetic field in a coil carried by the flow meter housing for generation of an electrical signal each time the magnet moves in close proximity to the coil during rotation of the rotor. The rotor assembly also incorporates flow directing elements on either side of the rotor which are supported by a shaft that also forms an axis for the rotor causing the fluid to change in pressure and velocity as it flows to and from the turbine rotor element. Centering elements are also supported by the axial shaft which are linearly movable relative to the axis and relative to the rotor. Rotor support means is disposed within the flow chamber and engages both the housing structure and the spaced elements supported by the axial shaft to support the rotor assembly within the flow chamber of the housing. The spaced centering elements and the rotor assembly support means are provided with cooperative cam energized centering vanes that causes the axial shaft supporting the rotor assembly and rotor to be precisely centered and axially aligned within the flow chamber of the housing during assembly of the flow meter mechanism.

The spaced rotor centering elements carried by the axial shaft may take the form of generally cylindrical elements having slots formed therein, which slots are spaced substantially equidistantly about the periphery of the cylindrical centering elements. The bottom surfaces of the slots taper downwardly and inwardly toward the rotor and define cam surfaces. A plurality of plate like vanes may be disposed within the flow chamber and may be received within respective slots of the elongated rotor support elements. Tapered cam surfaces may be formed on the vane elements which have cooperative engagement with the inwardly and downwardly tapered cam surfaces of the elongated rotor support and centering elements and which cause reaction during movement of the elongated rotor support and centering elements toward one another to cause simultaneous and equal radially outward movement of the vane elements toward the wall structure of the housing. After contact is made between the vane elements and the housing, continued cam reaction between the tapered cam surfaces of the elongated rotor support and centering elements and the vane elements will induce the rotor assembly to become precisely centered relative to the flow chamber of the housing and continued movement of the elongated rotor support elements toward one another will, through cooperative camming relationship between the tapered surfaces of the rotor support elements and the vanes, cause sufficient frictional contact to be developed between the vane elements and the housing structure and between the vane elements and the rotor assembly support elements to positively lock the rotor assembly relative to the housing structure.

A single adjustment mechanism such as an adjustment nut may be received by the axial shaft and may be manipulated to cause the elongated rotor support elements to move toward one another during assembly of the flow meter construction to develop the force required for centering and locking of the rotor assembly within the housing of the flow meter.

BRIEF DESCRIPTION OF THE DRAWINGS

In order that the manner in which the above recited advantages and objects of the invention are attained, as well as others, which will become apparent, can be understood in detail, more particular description of the invention, briefly summarized above, may be had by reference to the specific embodiments thereof that are illustrated in the appended drawings, which drawings form a part of this specification. It is to be understood, however, that the appended drawings illustrate only typical embodiments of the invention and are therefore not to be considered limiting of its scope, for the invention may admit to other equally effective embodiments.

IN THE DRAWINGS

FIG. 1 is a sectional view of a flow meter constructed in accordance with the present invention, which sectional view is taken along line 1—1 in FIG. 2.

FIG. 2 is a transverse sectional view of the flow meter construction illustrated in FIG. 1, which transverse sectional view is taken along line 2—2 in FIG. 1.

Figure 3:
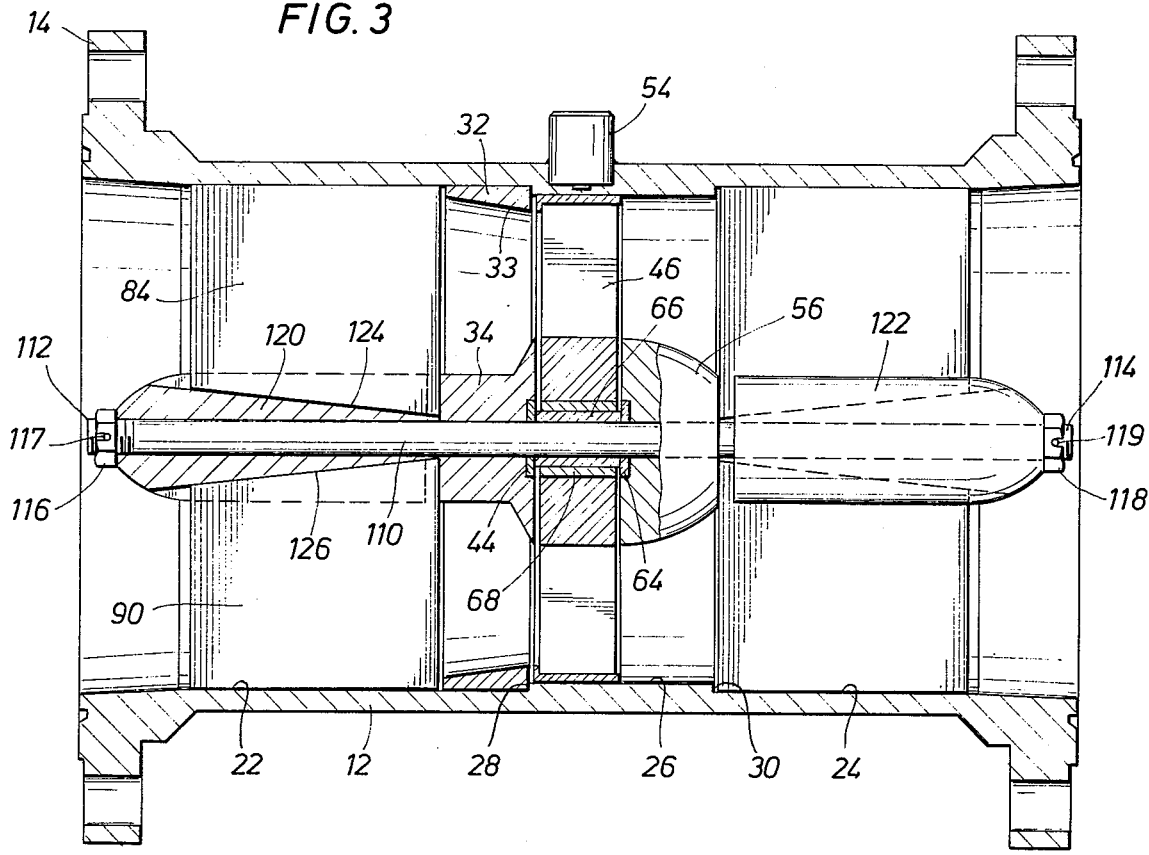
Figure 4:
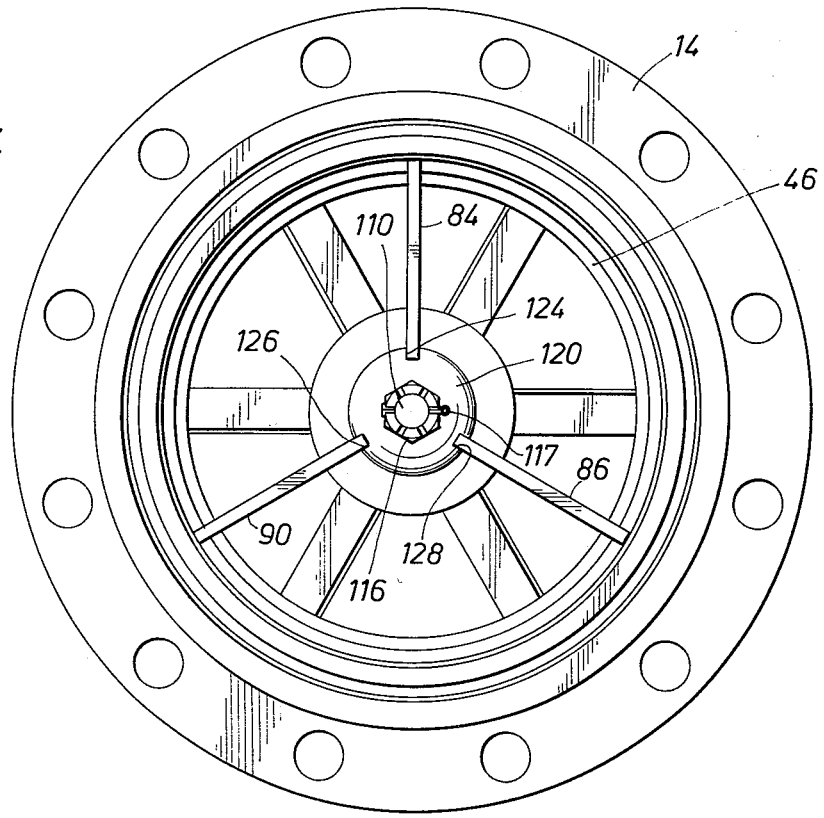

FIG. 3 is a sectional view of a flow meter construction representing a modified embodiment of the present invention, which sectional view is taken along line 3—3 in FIG. 4.

FIG. 4 is a transverse sectional view of the flow meter construction illustrated in FIG. 3, which transverse sectional view is taken along line 4—4 of FIG. 3.

DETAILED DESCRIPTION OF PREFERRED EMBODIMENT

Now referring to the drawings and first to FIG. 1, there is depicted a flow meter, illustrated generally at 10, having a housing 12 provided with end connections 14 and 16 that are each appropriately provided with a plurality of bolt holes 18 to enable the housing structure to be secured by bolts or threaded studs to appropriate flanges of a conduit in which the flow meter may be disposed.

A flow chamber is defined within the housing 12 by generally cylindrical bores 22 and 24 that are spaced by a reduced diameter bore 26 that defines opposed shoulders 28 and 30. The cylindrical surfaces 22, 24 and 26 are disposed in concentric relation and, although the cylindrical surfaces 22 and 24 are concentric one with the other, they need not be of the same dimension. As explained above, ordinarily it is required that opposed cylindrical surfaces provided for support of a rotor mechanism be of precisely the same dimension. And, as also noted, machining operations that develop such precision surfaces are quite expensive and represent a large part of the overall cost of such flow meters. The present invention effectively eliminates the need for the surfaces 22 and 24 to be of the same dimension and therefore effectively eliminates a substantial portion in manufacturing cost that would otherwise be required by providing high quality machined concentric surfaces of precisely the same dimension.

A flow directing ring 32 may be disposed within the flow chamber 20 and may be in loosely received relation within the bore 22 with one side of the outer peripheral portion of the ring disposed in supported contact with the annular shoulder 28. The flow directing ring 32 may have a frustoconical surface 33 serving to direct flowing fluid to the blades of a rotor of the meter and to prevent flowing fluid from being directed against the ring-like outer portion of the rotor. A centerally located upstream flow directing element 34 may be provided that is of slightly greater axial dimension as compared to the axial dimension of the ring and may have an axial bore 36 formed through the center portion thereof which may be extended an axial shaft 38. The axial extremities of the flow directing element 34 may define generally planar surfaces 40 and 42 each extending slightly beyond the respective axial extremities of the flow directing ring. A circular flat thrust bearing element 44 may be received in a recess formed in the center portion 34 of the flow directing element in such manner that the outer surface of the bearing element is substantially co-planar with the planar surface 42. Bearing 44 may be formed of carbide or any other suitable bearing material having good wear characteristics.

A rotor element 46 will be rotatably disposed within the flow chamber 20 and may be provided with an outer rimmed portion 48 within which may be supported one or more magnet elements 50 that, at specific points during rotation of the rotor element 46, move into juxtaposition with a pick-up element 52 of a coil 54, thereby inducing in the pick-up coil signal impulses which may either be counted for securing an indication of the flow rate of the stream, or may be utilized for securing a direct current voltage proportional to the rate of rotation of the rotor, and hence to the rate of flow of the stream. Since both methods of utilizing the impulses are well known commercially and neither forms a part of the present invention, the mechanism for securing these results is not depicted in the drawings and will not be described herein. The housing 12 of the flow meter construction will be constructed of any suitable non-ferous material, thereby allowing magnetic flux of the magnet 50 to be induced through the wall structure of the housing 12 where it is inductively detected by the coil 54.

A downstream rotor positioning and flow controlling element 56 may be provided having an axial bore 58 formed therethrough which bore also receives the shaft 38 and the rotor positioning element 56 may also have a pair of generally planar surfaces 60 and 62 formed thereon. An annular washer-like thrust bearing element 64 similar to thrust bearing 44 may be received within an appropriate recess formed in the rotor positioning element 56 with the outer surface of the bearing element also disposed in generally co-planar relation with the planar surface 60. A bearing bushing 66 may also be received by the axial shaft 38 and may be disposed in bearing engagement with a journal 68 that defines the axial center of the rotor 46. The extremities of the bearing bushing 66 may be disposed in engagement with the appropriate thrust bearings 44 and 64 to properly dispose the rotor 46 in spaced relationship with the upstream flowing directing element 34 and with the downstream flow directing element 56. As flowing fluid passes through the flow chamber 20 of the meter the upstream flow directing element 34 will function with the conical surface 33 of the flow directing ring 32 to cause increase in velocity of the fluid stream together with consequent reduction in pressure in the vecinity of the rotor 46. This venturi effect enhances accuracy and efficiency of meter operation.

It will be desirable to retain the rotor mount assembly in precisely axially centered relationship within the flow chamber 20, disposing the axial shaft 38 in precisely co-axial relationship with the cylindrical surfaces 22 and 24 of the housing. One suitable means for accomplishing centering of the rotor assembly may conveniently take the form illustrated in FIGS. 1 and 2, where a pair of elongated centering elements 70 and 72 are provided, each having axial bores 74 and 76 respectively, that receive the axial shaft 38 in movable relation therewith. The centering elements 70 and 72 may be of generally identical configuration, if desired, and as shown in FIG. 2, may be of generally cylindrical outer configuration. A plurality of slots 78, 80 and 82 may be formed in each of the centering elements which slots may be disposed to receive vane type centering and locking elements 84, 86 and 90, respectively. The bottom surface of each of the slots 78, 80 and 82 may be tapered as shown at 92, thereby providing cam surfaces that are disposed in mating relationship with respective cam surfaces formed on the vane elements, such as shown at 94 in FIG. 1.

The cam surfaces 94 of the vanes are oppositely tapered with respect to the tapered cam surfaces defining the bottom of each of the slots thereby cooperating with the surfaces 92 upon linear movement of the centering elements 70 and 72, relative to the axial shaft 38, to induce radial movement to the respective vane elements 84, 86 and 90. The centering elements and vane elements at each extremity of the shaft 38 are positioned to be oppositely tapered, thereby causing all of the vane elements at each extremity of the shaft to be moved radially and simultaneously outward upon linear movement of the centering elements 70 and 72 toward one another. It should also be borne in mind that radially outward portion of the vane elements will be in engagement with the cylindrical surfaces 22 and 24 to provide structural support between the centering elements and the housing for the entire rotor assembly.

In order to achieve adjustment of the centering elements 70 and 72 relative to the shaft 38, a cap 96 may be non-rotatably secured to one extremity of the shaft 38 such as by threading or the like, which cap may be provided with a slot 98 to facilitate engagement by a tool such as a screwdriver in order to prevent rotation of the cap and shaft during assembly and disassembly of the rotor mechanism. At the opposite extremity of the shaft 38 may be provided adjustment threads 100 which receive an adjustment nut 102 that bears against an adjustment washer 104. As the cap 96 is held immovable by means of a screwdriver engaging the slot 98, a simple wrench may be engaged with the adjustment nut 102 and the adjustment nut may be rotated in such a manner as to drive the centering elements 70 and 72 toward one another. When this occurs, the corresponding tapered cam surfaces 92 and 94 on the centering devices and vanes, respectively, will cooperatively react, thereby inducing radial movement to the vanes. As the vanes move radially outward they react against the cylindrical surfaces 22 and 24, causing centering movement of the axial shaft 38 and all of the components supported by the shaft. Since the surfaces 22 and 24 are concentric, centering movement of each extremity of the shaft 38 with respect to the surfaces 22 and 24 will result in precise centering of the entire rotor assembly within the flow chamber of the housing. If the surfaces 22 and 24 are of different dimension but are yet concentrically oriented, the vanes will simply center each extremity of the shaft relative to the respective cylindrical surface and the entire rotor assembly will be accurately centered.

ASSEMBLY

With the flow directing ring 32 disposed in the position illustrated in FIG. 1, with the downstream portion thereof in engagement with or near the annular shoulder 28, the axial shaft 38, with the lock nut 102 and washer 104 removed, will be inserted through the axial bore 74 of the centering element 70 and the vane elements 84, 86 and 90 will be disposed as shown at the left hand portion of FIG. 1 being received loosely within the slots of the centering element. The axial shaft 38, with the centering element 70 and the vanes will be inserted into the flow chamber and the centering element will be shifted relative to the vanes to cause the vanes to move radially into engagement with the cylindrical surface 22 due to the reaction of the cam surfaces of the centering element and vanes. The downstream edges of the vanes 84, 86 and 90 will be in spaced relation with the shoulder defined by the upstream portion of the flow directing ring 32. The upstream flow directing element will then be inserted onto the shaft and will be moved toward the centering element 70 until the stop shoulder 40 contacts the downstream edges of the vanes.

After this has been accomplished, the rotor element 46 with the bearing bushing 66 in place as shown will be inserted onto the shaft 38 and will be moved substantially to the position illustrated in FIG. 1, with the bushing 66 contacting the thrust washer 44. The downstream rotor positioning element 56 will then be received by the shaft and will be moved substantially to the position illustrated in FIG. 1 with the thrust washer 64 in engagement with the bushing 66. The downstream centering element 72, with the vanes emplaced within the respective grooves or slots thereof, will be then received by the shaft 38 and will be moved to the left sufficiently to bring the upstream edges of the vanes into engagement with the downstream surface 62 of the flow directing element 56. When this has been accomplished, the washer 104 will be emplaced and the adjustment nut 102 will be threaded onto the shaft 38 and will be manipulated while maintaining the cap 96 and shaft 38 in immovable relation with a screwdriver or other such tool. The adjustment nut, upon being rotated, will urge all of the parts into intimate bearing contact and, after having done so, will upon further rotation, through cooperative relationship between the cam surfaces 92 and 94, achieve radial movement of the vane elements, thereby moving the vane elements into tight frictional contact with the bores or cylindrical surfaces 22 and 24 defining the internal wall structure of the housing 12. After the adjustment nut has been sufficiently rotated to achieve sufficient frictional contact with the surfaces 22 and 24 to cause positive locking of the rotor assembly within the housing structure, a conventional cotter key 106 or other such locking device may be inserted through corresponding apertures in the adjustment nut and shaft 38, thereby locking the adjustment nut in immovable relation with the shaft. Disassembly of the flow meter mechanism will occur in opposite sequence to the assembly procedure set forth above.

Referring now to FIGS. 3 and 4, a modified embodiment of the present invention is illustrated that functions in the same manner as indicated above in connection with FIGS. 1 and 2. Like reference numerals will indicate like parts in the two modified embodiments that are shown. As illustrated in FIG. 3, a generally cylindrical flow meter body structure 12 is provided that is similar to the flow meter body 12 shown in FIG. 1 with the exception that seal recesses are provided at each of the connection flanges of the body and the body structure is provided with internally tapered surfaces defining inlet and outlet openings into the flow chamber defined within the housing. Generally cylindrical internal bores 22 and 24 are defined within the housing 12 and cooperate with a reduced diameter generally cylindrical surface 26 to define the flow chamber 20 for conducting flow fluid through the meter structure. The generally cylindrical surfaces 22, 24 and 26 are concentrically related and although surfaces 22 and 24 are illustrated as being of the same dimension, it is not necessary that they be of the same dimension. Juncture between the cylindrical surfaces 22 and 24 with the smaller diameter surface 26 defines annular shoulders 28 and 30.

An annular flow directing ring 32 is received within the cylindrical bore 22 and rests against the shoulder 28. Ring 32 is provided with a frusto-conical surface 33 that serves to direct the flow of fluid through the vanes of the rotor 46, thereby preventing the flowing fluid from impinging upon the ring like outer portion 48 of the rotor.

A shaft 110 may be disposed within the flow chamber 20 and may provide an axis about which the rotor 46 is rotatable. The axial shaft 10 will, in the properly aligned position of the various parts within the flow chamber, be disposed in parallel relation with the cylindrical surfaces 22 and 24 and will be precisely centered and concentric with respect to the cylindrical surfaces. The elongated shaft 110 may be provided with threaded extremities 112 and 114 that may receive adjustment nuts 116 and 118 respectively that may be secured in place by means of cotter keys 117 and 119 respectively.

For the purpose of establishing a rotatable relationship between the rotor 46 and the shaft 110 a bushing 66 may be disposed about the shaft and may receive a sleeve like bearing journal 68 that is provided to define the center of the rotor 46. The bushing and journal 66 and 68 may be composed of carbide or any other suitable bearing material within the spirit and scope of the present invention. Thrust forces against the bushing 66, which is slightly longer in axial direction than the journal 68, may be received by washer like thrust bearings 44 and 64 that are received within respective recesses formed in fluid flow controlling elements 34 and 56, respectively. Flow controlling element 34 is disposed on the upstream side of the rotor element and cooperates with the frusto-conical surface 33 to cause fluid flowing through the flow meter to increase in velocity with consequent reduction in pressure in the area of the rotor 46. The downstream flow controlling element 56 allows the flowing fluid to decrease in velocity as it flows toward the outlet opening of the valve construction. The thrust washers 44 and 64 may also be composed of carbide or some other suitable thrust bearing material.

For the purpose of causing centering of the shaft 110 within the cylindrical bores 22 and 24, a pair of centering elements 120 and 122 may be received by the shaft 110 and may be of generally identical construction, thereby allowing the centering elements to be utilized both as upstream and downstream centering devices. The respective leading and trailing extremities of the centering elements are of curved configuration to reduce the flow resistance thereof to a minimum. As shown in detail in FIG. 4, each of the centering elements may be provided with a plurality of elongated slots 124, 126 and 128 each having bottom walls that taper radially inwardly toward the rotor element. Each of the bottom walls is substantially flat, thereby defining a relatively flat cam surface that is disposed for engagement by mating cam surfaces defined on a plurality of vane elements 84, 86 and 90 that contact both the centering elements and the cylindrical walls 22 and 24 respectively to cause the rotor assembly to be positively retained within the housing structure in the same manner as described above in connection with FIGS. 1 and 2.

The structure set forth in FIGS. 3 and 4 is assembled in the same manner as described above in connection with FIGS. 1 and 2 with the exception that one of the adjustment nuts such as shown at 116 is placed on the shaft 110 in properly oriented manner and is locked with respect to the shaft by means of the cotter key 117. The parts are then brought into assembly in a manner discussed above with the adjustment nut 118 being the last element received by the shaft 110. Threading of the adjustment nut 118 into its proper position relative to the shaft will cause the centering elements 120 and 122 to be drawn toward one another, thereby causing inter action between the cam surfaces of the centering elements and the cam surfaces of the vanes, causing the vanes to be moved radially outwardly into friction tight locking engagement with the cylindrical walls 22 and 24 of the housing structure.

In view of the foregoing, it is evident that I have provided a novel flow meter mechanism that effectively accomplishes efficient precise centering of a rotor mechanism within a flow chamber even though relatively low cost machining operations have been involved in machining internal rotor support surfaces in the housing. By employing the simple rotor centering mechanism of the present invention, each extremity of the rotor assembly is precisely centered relative to the cylindrical bore within which it is disposed. Even though the cylindrical bores are of different dimension the rotor assembly will be precisely centered as long as each of the bores are concentrically related. The vanes, having cam surfaces formed thereon and reacting with respective ones of the centering elements 70 and 72 will be urged radially outwardly until firm friction type contact is established with the particular cylindrical surface involved and friction tight contact will be established simultaneously at each extremity of the housing structure regardless of the differing dimension that might exist between surfaces 22 and 24 as long as the cylindrical surfaces 22 and 24 are concentrically related.

I have also provided a novel flow meter mechanism that may be very simply and efficiently assembled by relatively inexperienced assembly personnel because of the simplicity of the assembly procedure, thereby further promoting the low cost aspect of the present invention. Moreover, the uniqueness and simplicity of construction and the ease of assembly efficiently promote the capability for field servicing even though it may be desirable to replace virtually all of the internal parts of the flow meter assembly. It is apparent therefore that the present invention is one well adapted to attain all of the objects hereinabove set forth together with other advantages which will become obvious and inherent from the description of the apparatus itself. It will be understood that certain combinations and subcombinations are of utility and may be employed without reference to other features and subcombinations. As many possible embodiments may be made of this invention without departing from the spirit or scope thereof it is to understood that all matters herein set forth or shown in the accompanying drawings are to be interpreted as illustrative and not in a limiting sense.

What is claimed is:

1. A flow meter for measuring the volume of fluid flowing through a conduit, said flow meter comprising:
    a housing defining a flow chamber, said housing defining inlet and outlet openings and having connection means for connection thereof into said conduit;
    rotor assembly means disposed within said flow chamber and having a rotor element that is rotatable by the fluid flowing through said flow chamber;
    first centering means being provided on said rotor assembly means;
    rotor assembly support means being disposed within said flow chamber and engaging said housing, said rotor assembly support means engaging said first centering means of said rotor assembly means; and
    second centering means being defined by said rotor means and being disposed within said flow chamber, said second centering means engaging said rotor assembly support means and reacting with said first centering means of said rotor assembly means to cause precise centering of said rotor assembly means within said flow chamber.

2. A flow meter as recited in claim 1, wherein:
    said rotor assembly support means includes a plurality of rotor support elements having substantially equidistantly spaced contact with both said housing and said rotor assembly means.

3. A flow meter as recited in claim 1, wherein:

said rotor assembly support menas have cam means defined thereon, said cam means reacting with said first centering means of said rotor means and said housing during assembly of said flow meter to cause precise centering of said rotor means within said flow chamber.

4. A flow meter as recited in claim 1, wherein:
said first centering means comprises second cam means being defined on said rotor support means, said first and second cam means cooperatively reacting during assembly of said flow meter for causing said centering of said rotor means and for developing sufficient frictional contact between said rotor support means, said rotor means and said housing for maintaining said rotor means in firmly supported and centered relation within said flow chamber.

5. A flow meter as recited in claim 1, wherein:
said flow chamber within said housing is defined in part by a pair of spaced concentric cylindrical surfaces formed within said housing; and
said centering means engaging said cylindrical surfaces and reacting therewith to achieve axial positioning of said rotor means within said flow chamber.

6. A flow meter as recited in claim 1, wherein:
said rotor means has a shaft defining an axis about which said rotor element rotates;
adjustment means being carried by said shaft;
said first centering means comprising opposed first cam means being supported by said shaft on opposite sides of said rotor element, said first cam means being linearly movable upon movement of said adjustment means; and
said second centering means comprising second cam means being formed on said rotor assembly support means and reacting with said first cam means upon movement of said adjustment means for causing movement of said rotor means to the concentric position thereof within said flow chamber and for developing sufficient frictional contact between said rotor assembly support means, said rotor means and said housing for maintaining said rotor assembly means in firmly supported and centered relation within said flow chamber.

7. A flow meter as recited in claim 1, wherein:
said rotor means has a shaft defining an axis about which said rotor element rotates;
a pair of centering elements are movably supported by said shaft on opposite sides of said rotor element, said first centering means comprising tapered cam surface means formed on said centering elements; and
said rotor assembly support means comprise a plurality of support vanes, said second centering means comprises cam surface means being formed on each of said vanes and having mating engagement with said cam surface means of said centering elements, said vanes engaging said housing for retention of said rotor assembly means within said housing and said cam surfaces cooperatively reacting to achieve said centering of said rotor assembly means within said flow chamber.

8. A flow meter as recited in claim 7, wherein:
said centering elements have a plurality of slots formed substantially equidistantly about the outer periphery thereof;
said first cam surface means comprise tapered cam surfaces defining the bottom of each of said slots; and
said vanes being received within respective ones of said slots with said cam surfaces of said vanes being disposed in camming engagement with respective ones of said tapered cam surfaces at the bottom of each of said slots.

9. A flow meter as recited in claim 7, wherein:
adjustment means, upon being manipulated, causes relative linear movement of said centering elements and causes said cam surfaces of said centering elements and said vanes to cooperatively react to induce radial movement of said vanes, urging the outer portion of said vanes into tight supporting engagement with said housing.

10. A flow meter as recited in claim 9, wherein:
said adjustment means comprises threads formed at one extremity of said axial shaft and an adjustment nut being threadedly received by said threads and, upon being rotated relative to said shaft, causing said linear movement of said centering elements.

11. A flow meter for measuring the volume of fluid flowing through a conduit, said flow meter comprising:
a housing defining a flow chamber, said housing defining inlet and outlet openings and having connection means for connection thereof into said conduit;
a rotor assembly being disposed within said flow chamber and having a rotor element that is rotatable by fluid flowing through said flow chamber;
first centering means being provided on said rotor assembly for centering of said rotor assembly within said flow chamber;
rotor assembly support means being disposed within said flow chamber and engaging said first centering means and said housing; and
second centering means being formed on said rotor assembly support means and reacting with said first centering means to cause said centering of said rotor assembly.

12. A flow meter as recited in claim 11, wherein:
said first centering means comprise a pair of spaced elements having oppositely disposed cam surfaces formed thereon; and
said rotor assembly support means comprise a plurality of vane elements being disposed in substantially equidistantly spaced relation about said first centering means and said housing and being disposed in rotor assembly supporting engagement with both said first centering means and said housing.

13. A flow meter as recited in claim 11, wherein:
an elongated shaft is disposed within said flow chamber and defines an axis about which said rotor element is rotatable;
said first centering means comprises a pair of hubs supported by said elongated shaft and being disposed on either side of said rotor means;
cam surface means being formed on each of said hubs and being disposed in oppositely directed relation one with the other;
said rotor assembly supported means comprising a plurality of vane elements each engaging said cam surface means and also engaging said housing;
means for imparting controlled relative movement of said hubs on said shaft; and
said rotor assembly support vanes cooperating with said cam surface means, responsive to said controlled relative movement of said hubs, to induce radial movement of said vanes to cause friction tight supporting engagement between said vanes and said housing and between said vanes and said hubs.

14. A flow meter as recited in claim 13, wherein:

said centering means is of elongated generally cylindrical configuration;

slot means is formed in said centering means generally equidistantly about the periphery thereof;

said cam surface means comprises a plurality of elongated tapered cam surfaces defining the bottom surfaces of each of said slots; and said vanes are disposed one within each of said slots and in engagement with respective ones of said cam surfaces.

15. A flow meter as recited in claim 13, wherein: said vane elements have tapered cam surfaces formed thereon and having mating engagement with said cam surface means of said hubs, said cam surfaces and said cam surface means cooperatively reacting during linear movement of said hubs to impart said radial movement to said vanes.

16. A flow meter as recited in claim 11, wherein:

an elongated shaft is disposed within said flow chamber and defines an axis about which said rotor element is rotatable;

a rotor bearing is received about said elongated shaft and provides rotatable support for said rotor element;

fluid flow directing elements are disposed on either side of said rotor journal and bear against said rotor bearing; and said rotor assembly support means engage said fluid flow directing elements.

* * * * *